United States Patent [19]

Vermes et al.

[11] Patent Number: 4,995,976

[45] Date of Patent: Feb. 26, 1991

[54] WATER PURIFICATION STRAW

[75] Inventors: Sheldon A. Vermes, Shoreview; David M. Botts, Spring Park; Charles A. Peterson, Hopkins, all of Minn.

[73] Assignee: Water Technologies Corporation, Plymouth, Minn.

[21] Appl. No.: 531,125

[22] Filed: May 31, 1990

[51] Int. Cl.$^5$ .............................................. B01D 24/08
[52] U.S. Cl. ..................................... 210/266; 210/282; 210/283; 210/289; 210/501; 210/502.1
[58] Field of Search ............... 210/202, 266, 501, 282, 210/283, 287, 290, 289, 502; 424/179, 150

[56] References Cited

U.S. PATENT DOCUMENTS

| | | | |
|---|---|---|---|
| 1,000,332 | 8/1911 | Dyer | 210/314 |
| 1,333,011 | 12/1917 | Crady | 210/282 |
| 2,781,312 | 2/1957 | Klumb et al. | 210/282 |
| 3,327,859 | 6/1967 | Pall | 210/266 |
| 3,389,803 | 6/1968 | Barley | 210/266 |
| 3,392,837 | 7/1968 | Sanzenbacher | 210/282 |
| 3,715,035 | 2/1973 | Teeple, Jr. et al. | 210/249 |
| 3,744,639 | 7/1973 | Teeple, Jr. et al. | 210/282 |
| 3,923,665 | 12/1975 | Lambert et al. | 210/501 |
| 4,298,475 | 11/1981 | Gartner | 210/266 |
| 4,529,511 | 7/1985 | Breeden et al. | 210/282 |
| 4,769,144 | 9/1988 | Nohren, Jr. | 210/282 |

Primary Examiner—Stanley Silverman
Assistant Examiner—Cynthia L. Nessler
Attorney, Agent, or Firm—Kinney & Lange

[57] ABSTRACT

An orally usable filter straw for the purification of water by forced movement of the water through the straw. The straw includes an elongated tubular conduit having an inlet for reception of the water at a distal end of the conduit and having an outlet at a proximal end of the conduit for expulsion of the treated water. Beginning at the inlet of the straw, the straw includes the following materials retained within the conduit: a removably mounted filter, a purification resin, activated carbon granules, and a bactericide resin. A mouthpiece is mounted at the outlet of the conduit to allow the device to be suitably received by a human user. The straw includes a series of porous spacers positioned within the conduit to segregate the materials retained within the straw.

16 Claims, 1 Drawing Sheet

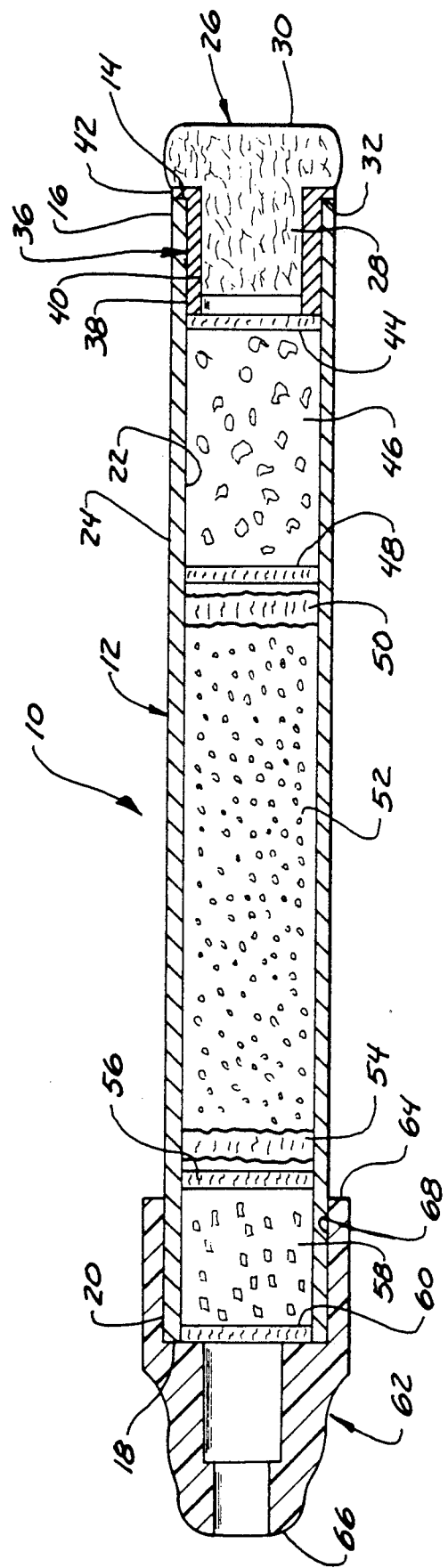

WATER PURIFICATION STRAW

BACKGROUND OF THE INVENTION

The present invention relates to portable water purification systems and, in particular, a water purifier orally operable by a human.

DESCRIPTION OF THE PRIOR ART

In an attempt to combat the high degree of impurities, contaminants, and chemicals in most sources of drinking water, people have turned to the use of water purification systems. Many large scale purifying systems have been developed and perform the task adequately. However, one does not always have access to water purified by a large scale purifier. Therefore, portable water purifiers have been developed to allow a user to obtain clean water wherever the person may go. Lightweight designs have been achieved that allow oral operation and storage within a pocket of clothing. Water purifiers of this type and others are disclosed, for example, in the following U.S. Patent Numbers:

| Dyer | 1,000,332 |
|---|---|
| Crady | 1,333,011 |
| Pall | 3,327,859 |
| Barley | 3,389,803 |
| Sanzenbacher | 3,392,837 |
| Teeple | 3,715,035 |
| Lambert | 3,923,665 |
| Gartner | 4,298,475 |

Pall, Sanzenbacher, and Teeple disclose portable water purifiers having a series of materials within a large structured container and include a bacteria removal portion, activated charcoal or carbon, and other filter means for a moving particulate matter. However, each of the structures are so large as to prohibit discrete transport of the water purifier because the device could not be carried on a person unobtrusively. Pall discloses a generally rectangular box-like structure with a carrying case to retain extending parts of the device and to protect the purifier. Sanzenbacher discloses a large scale purifier also with a rectangular box-like structure having several solid protrusions extending thereon, including a handle for carrying the device and an outlet for obtaining the treated water.

Teeple discloses a collapsible bag-like structure that requires the user to hang the purifier for operation of the device and ultimately to obtain treated water after the water drains through the purifier.

These structures present an impediment for unobtrusive portability of a water purifier because they have structures with protrusions. Furthermore, these devices require steps to be taken by the user before the purification process can begin: either pouring water into the device or unpacking the device from a protective case designed to retain the protrusions.

In response to the shortcomings of larger-scale portable water purifiers, straw-like pocket purifiers have been developed. Dyer, Crady, Barley, and Gartner disclose structures having a filtering material, including activated charcoal or carbon, and a bacteria removal material. The structures allow transportation or storage of the device within a pocket of clothing or other personals.

Dyer and Crady disclose straws that have multiple parts cooperable with one another to allow disassembly and assembly of the device. Crady shows a straw having two parts which releasably engage each other by means of cooperable screw threads placed on each part of the straw. Dyer also discloses a two-part straw whereby a filter part releasably engages the other part of the straw by means of a cooperable screw thread, the other part also including a telescopically collapsible mouthpiece portion. In order to purify drinking water, this design requires the user to assemble the straw from an inoperable storage position. Both Dyer and Crady also allow the replacement of the filtering material, such as activated charcoal, by permitting the removal of screens located within the straw through the disassembly of the straw.

Barley discloses a one-piece pocket straw which contains a bacterial filter between two screens, a filter plate, activated carbon, and another filter plate. Gartner discloses a one-piece pocket straw that contains the bacteria removal material as a first step in treatment of the water followed by activated carbon as the last step in treatment of the water. Filter means are positioned before the bacterial removal resin, between the activated carbon and the bacteria removal material, and after the activated carbon. However, neither Gartner nor Barley permit the replacement of the particulate filter plate or the filter means, respectively, and Crady and Dyer require some disassembly of the straw to replace the filtering material enclosed therein. Furthermore, neither Gartner nor Barley provide a mechanism to insure that the activated carbon is maintained in a uniform structural state, and that both the carbon and mouthpiece remain free of saliva-borne or air-borne bacteria.

Lambert also discloses that a demand bactericide, such as a strong base anion exchange resin containing triodide, may be used as a bacteria removal agent to kill bacteria without leaving significant amounts of residual iodine in the treated water.

There is a continuing need for improved orally operable portable water purifiers. The purifier should be designed so that it may be readily carried unobtrusively in a pocket and available for direct use without any assembly. Furthermore, the device should permit the quick removal and exchange of an initial particulate filter without disassembly of the device. This capability will thereby reduce the cost of using a pocket purifying system because the whole straw need not be replaced when the particulate filter becomes occluded. The design should include a powerful bactericide to kill or remove all organic matter and other harmful bacteria. It is also desirable to include an activated carbon material and maintain the carbon in a uniform structural state to ensure proper adsorption of taste and odor contaminants and to ensure removal of the iodine from the water. In addition, the device should be designed so that an additional bactericide operates on the water after the carbon stage to provide a residual level of iodine in the water to prevent airborne bacteria and saliva-borne organisms from growing in the activated carbon material, as well as keeping the mouthpiece free from similar contamination.

SUMMARY OF THE INVENTION

The present invention is an orally operable portable water purifier which removes contaminants and bacteria from ordinary water to provide suitable drinking water. The water purifier comprises a straw which purifies the water by forced movement of the water through the straw. The straw includes an elongated tubular conduit with an inlet at a distal end of the conduit and an outlet at a proximal end of the conduit, with an inlet filter removably mounted at the distal end of the conduit. Proximal to the filter is a purification material, an activated carbon material, and a bactericide material in series. A plurality of porous spacers are positioned selectively within the conduit as follows: a first spacer between the filter and the purification material; a second spacer between the purification material and the carbon material; a third spacer between the carbon material and the bactericide material; and a fourth spacer proximal to the bactericide material. A tubular mouthpiece is mounted to the proximal end of the conduit.

In a preferred embodiment of the present invention, the straw also includes resilient foam layers positioned at opposite ends of the carbon material to permit expansion of the activated carbon. Moreover, the pore size of the inlet filter is smaller than the pore size of the porous spacer or the foam layer, and the pore size of the foam layer is larger than the pore size of the porous spacer. The inlet filter is frictionally inserted partially within the inlet of the conduit and has a slightly compressible retention ring surrounding the filter and of size to frictionally engage an inner surface of the conduit. The purification material is a pentacide resin, the carbon material is a granular activated carbon, and the bactericide material is a triocide resin, all of which are known materials. The porous spacers are a porous plastic.

The purifier, in accordance with the present invention, is small, and unobtrusively carriable in a pocket. The inlet filter is quickly removable allowing an occluded particulate filter to be quickly exchanged for a new filter without any required disassembly of the straw. Furthermore, the initial bactericide purification material, in combination with the activated carbon, and the final bactericide stage produce a final product of drinking water suitable for consumption and that also maintains the carbon and mouthpiece in an anti-bacterial state.

BRIEF DESCRIPTION OF THE DRAWING

The FIGURE is a longitudinal sectional view of the water purification straw of the present invention.

DETAILED DESCRIPTION OF THE PREFERRED EMBODIMENTS

The present invention of a water purification straw is illustrated generally at 10. The straw 10 includes an elongated tubular conduit 12, which has an inlet 14 at a distal end 16 and an outlet 18 at a proximal end 20. The conduit 12 also has an inner surface 22 and an outer surface 24. The conduit 12 is made preferably of a polycarbonate material and is preferably circular in cross section.

A removable inlet filter 26 is positioned within the inlet 14 and has a neck 28 and a head 30, joined by shoulder 32. A retention ring or sleeve 36 is also positioned within the inlet 14 and has an outer surface 38, an inner surface 40, and a lip 42. The outer surface 38 of ring 36 frictionally engages the inner surface 22 of conduit 12 and the lip 42 of ring 36 abuts the distal end 16 of conduit 12 to further constrain the ring 36 relative to the conduit 12. The neck 28 of filter 26 frictionally engages the inner surface 40 of ring 36 and is partially inserted within the inlet 14 such that ring 36 surrounds the neck of filter 26. The shoulder 32 of head 30 abuts lip 42 of ring 36 to further constrain movement of the filter 26 relative to the conduit 12 and ring 36. The ring or sleeve 36 is made of a slightly compressible material to provide a friction fit for the filter.

The inlet filter 26 is a removable and is used for removing particulates and sediment from the water. The filter 26 is made preferably of a porous plastic and preferably has a pore size of about 80 microns, for example. The retention ring 36 is made preferably of a polycarbonate material.

A first porous spacer 44 of a plurality of porous spacers, which are positioned within the conduit 12, is positioned proximally adjacent to the ring 36 within conduit 12. The spacer 44 is a disk that firmly engages the inner surface 22 of conduit 12. The first spacer 44 is made preferably of a porous plastic and preferably has a pore size larger than the pore size of the removable inlet filter 26. A preferable pore size for the first spacer 44 is 140 microns. The spacer 44, in combination with other spacers within the conduit 12, aid in keeping the various materials within the conduit 12 segregated appropriately.

A purification resin 46 is filled within conduit 12 between the first spacer 44 and a second porous spacer 48. The purification resin 46 acts to kill nearly all bacteria, and organic materials or organisms that are present in the water being subject to treatment. The purification resin 46 is made preferably of a pentacide resin, such as the pentacide resin obtainable through Water Technologies Corporation, the assignee of this application. The resin can be any suitable bactericide.

A first resilient foam layer 50 is positioned proximally adjacent to the second spacer 48 on a side of the spacer opposite from the resin 46. Activated carbon granules 52 are filled within the conduit 12 between the first resilient foam layer 50 and a second resilient foam layer 54. The activated carbon 52 acts as an adsorptive media to remove taste and odor contaminants, as well as reduce the residual iodine level in the purified water resulting from the action of resin 46.

The foam layers 50 and 54 act as expansion joints to prevent channeling of the carbon 52 and to allow the carbon 52 to expand permitting even flow of the water. The foam layers 50 and 54 have a pore size larger than the pore size of the inlet filter 26 or the porous spacers. A preferable pore size for the foam layers 50 and 54 is 240 microns. The foam layers 50 and 52 are preferably disks, which fit firmly within the conduit 12.

A third porous spacer 56 is positioned within the conduit 12 proximally adjacent to the foam layer 54. A bactericide resin 58 is filled within the conduit 12 between the third porous spacer 56 and a fourth porous spacer 60, which is positioned within the conduit 12 at the proximal end 20. The bactericide resin 58 is preferably a triocide resin and acts to prevent the entry and growth of air-borne bacteria and saliva-borne organisms within the activated carbon material 52 and a mouthpiece 62.

The mouthpiece 62 is mounted at the proximal end 20 of conduit 12 and has a securing end 64, a user end 66, and an inner surface 68. The inner surface 68 of mouthpiece 62 is mounted to the outer surface 24 of conduit 12. The securing end 64 engages the proximal end 20 and outer surface 24 of conduit 12, whereas the user end 66 is adapted to be received within the mouth or orifice of the straw device user. The mouthpiece 62 is made preferably of a polycarbonate or polypropylene material.

In operation, the straw device 10 is held by the user so that the distal end 16 and the inlet filter 26 are immersed within the water to be purified. Oral suction is applied by the user at the mouthpiece 62 to forcibly move the water through the conduit 12 from the inlet 14 to the outlet 18. As the water moves through inlet filter 26 after entering at head 30, most heavy particulate matter and sediment material is removed from the water by filter 26. Next, the filtered water passes through the first porous spacer 44 into the purification resin 46, such as a pentacide or strong bactericide. The pentacide resin 46 is the primary purification stage that acts to kill all bacteria, organic matter including microorganisms, and other contaminants within the water.

As the water passes further through the straw 10, it flows through second porous spacer 48 and then the first foam layer 50, followed by activated carbon 52. The activated carbon 52 is directed primarily at improving the taste of the purified water by acting as an adsorption medium to remove taste and odor contaminants in the water, as well as reducing the residual iodine level in the purified water that results from treatment by the purification resin 46. The granules of carbon 52 are permitted to expand and are maintained in a uniform structural state by slight compression forces from the resilient foam layers 50 and 54. The carbon particles are thus held from shifting laterally to avoid forming channels which permits untreated water to flow through the carbon section. The water is treated uniformly at an efficient rate.

Finally, the water moves through a third porous spacer 56 into the bactericide resin 58 which is the final treatment stage, and out through a fourth spacer 60, through the mouthpiece 62 into the user's mouth. The bactericide resin 58 primarily acts to prevent bacteria and organisms, which originate from the user's mouth or the surrounding environment, from entering the straw 10 through the mouthpiece 62 to contaminate the carbon 52 and the mouthpiece 62. The bactericide resin 58 contains a bactericide weaker than that of resin 46, and accomplishes the cleansing task by reintroducing a residual level of iodine into the water, such that bacteria are killed, but without unduly tainting the taste of the purified water. Thus, ordinary water is moved from the inlet 14 of the straw 10 to the outlet 18 of the straw 10 to provide a purified, clean and tasteful water product for the user.

The water purification straw 10 has considerable advantages over those of the prior art. The filter 26 is removable from the straw 10 and is replaceable so that the primary particulate filter 26 may be exchanged when the filter 26 becomes occluded. Thus, the entire straw 10 need not be disposed of when the particulate inlet filter 26 becomes plugged. This yields a cost savings to the user while allowing the straw 10 to be maintained at peak efficiency. The purification straw 10 has a lightweight design and low profile such that it may be carried within a pocket or personals in an unobtrusive fashion. Straw 10 does not require any assembly or disassembly for its use, or for removal and exchange of the filter 26. The foam layers 50 ensure that the activated carbon 52 will be maintained in a uniform structural state to permit efficient treatment of the purified water. The straw 10 also includes the use of a strong bactericide as a purification material 46 which is similar to that of the prior art. However, the straw 10 has an additional bactericide resin 58 following the carbon 52 which acts to keep the straw 10 free of user originated bacteria and organisms, thereby prolonging the useful life of the activated carbon 52 and straw 10. This last step also keeps the mouthpiece free from contamination without unduly hampering the taste or effectiveness of the purification process.

Suitable caps can be placed over the inlet filter and the mouthpiece when the straw is not in use, as is well known. Although the present invention has been described with reference to preferred embodiments, workers skilled in the art will recognize that changes may be made in form and detail without departing from the spirit and scope of the invention.

What is claimed is:

1. An orally usable filter straw for the purification of water by forced movement of water through the straw including:
    an elongated tubular conduit having an inlet at a distal end thereof, and an outlet at a proximal end thereof; and
    a filter removably mounted at the distal end of the conduit; and
    a purification material positioned within the conduit proximal to the filter;
    activated carbon material positioned within the conduit proximal to the purification material;
    bactericide material positioned within the conduit proximal to the activated carbon material;
    a plurality of porous spacers selectively positioned within the conduit, with a first spacer positioned between the filter and the purification material, a second spacer positioned between the purification material and the carbon material, a third spacer positioned between the carbon material and the bactericide material, and a fourth spacer positioned proximal to the bactericide material at the proximal end of the conduit; and
    a tubular mouthpiece mounted to the proximal end of the conduit.

2. The apparatus of claim and further including:
    resilient foam layers at opposite ends of the carbon material to permit expansion of the carbon material.

3. The apparatus of claim 2 wherein the filter pore size is smaller than the porous spacer pore size or foam layer pore size.

4. The apparatus of claim 3 wherein the foam layer pore size is larger than the porous spacer pore size.

5. The apparatus of claim 1 wherein the filter is frictionally inserted partially within the inlet at the distal end of the conduit.

6. The apparatus of claim 5 and further including:
    a retention ring surrounding the filter and of size to frictionally engage an inner surface of the conduit for retaining the filter.

7. The apparatus of claim 1 wherein the purification material is a pentacide resin or other bactericide.

8. The apparatus of claim 1 wherein the carbon material is a granular activated carbon.

9. The apparatus of claim 1 wherein the bactericide material is a triocide resin or other bactericide.

10. The apparatus of claim 1 wherein the porous spacer is a porous plastic.

11. The apparatus of claim 1 wherein the mouthpiece frictionally engages the outside of the proximal end of the conduit.

12. An orally usable filter straw for the purification of water by forced movement of water through the straw including:

an elongated tubular passageway having an inlet at a distal end thereof and an outlet at a proximal end thereof, with the following materials retained within the passageway:

an inlet filter removably mounted at the inlet of the passageway, the filter being retained within the passageway by a retention ring surrounding the filter and of size to frictionally engage in inner surface of the passageway;

a first porous spacer of a plurality of porous spacers positioned within the passageway, the first porous spacer proximally adjacent to the retention ring, the porous spacers having a pore size larger than the filter pore size;

a purification material proximal to the first porous spacer filling the passageway between the first spacer and a second porous spacer proximally adjacent to the purification material;

a first resilient foam layer of a pair of resilient foam layers, the first foam layer proximally adjacent to the second porous spacer;

activated carbon material proximal to the first foam layer filling the passageway between the first foam layer and a second foam layer proximally adjacent to the carbon material, the foam layers exerting a small compression force on the activated carbon and permitting the carbon particles to expand;

a third porous spacer proximally adjacent to the second foam layer;

a bactericide material proximal to the third porous spacer filling the passageway between the third porous spacer and a fourth porous spacer proximally adjacent to the bactericide material; and a tubular mouthpiece mounted at the outlet of the passageway.

13. The apparatus of claim 12 wherein the purification material is a pentacide resin or other bactericide.

14. The apparatus of claim 12 wherein the carbon material is a granular activated carbon.

15. The apparatus of claim 12 wherein the bactericide material is a triocide resin or other bactericide.

16. The apparatus of claim 12 wherein the porous spacer is a porous plastic.

* * * * *

UNITED STATES PATENT AND TRADEMARK OFFICE
CERTIFICATE OF CORRECTION

PATENT NO. : 4,995,976

DATED : February 26, 1991

INVENTOR(S) : Sheldon A. Vermes et al.

It is certified that error appears in the above-identified patent and that said Letters Patent is hereby corrected as shown below:

Col. 6, line 39, delete "claim", insert --claim 1--.

Signed and Sealed this

Sixth Day of October, 1992

*Attest:*

DOUGLAS B. COMER

*Attesting Officer*      *Acting Commissioner of Patents and Trademarks*